United States Patent [19]

Blazek et al.

[11] 4,193,075
[45] Mar. 11, 1980

[54] LOW ANGLE ELEVATION GUIDANCE SYSTEM

[75] Inventors: Gustav Blazek; Arthur Charych, both of Stony Brook, N.Y.

[73] Assignee: Eaton Corporation, Cleveland, Ohio

[21] Appl. No.: 920,479

[22] Filed: Jun. 29, 1978

[51] Int. Cl.² .......................... G01S 1/16; G01S 1/54
[52] U.S. Cl. ........................... 343/108 M; 343/106 R
[58] Field of Search ....................... 343/108 M, 106 R

[56] References Cited

U.S. PATENT DOCUMENTS

| 3,028,600 | 4/1962 | Bailey | 343/113 R |
| 4,129,870 | 12/1978 | Toman | 343/108 M X |

Primary Examiner—Maynard R. Wilbur
Assistant Examiner—Richard E. Berger
Attorney, Agent, or Firm—Kevin Redmond

[57] ABSTRACT

A system for providing aircraft guidance at elevation angles less than the transmitting antenna beamwidth.

7 Claims, 8 Drawing Figures $T_0$ = REFERENCE TIME
$T_1$ = IDEAL PATTERN CENTER TIME
$T_2$ = RECEIVED PATTERN CENTER TIME
$T_3$ = CORRECTION TIME $\phi_1$ = ELEVATION ANGLE AT $T_1$
$\phi_2$ = ELEVATION ANGLE AT $T_2$

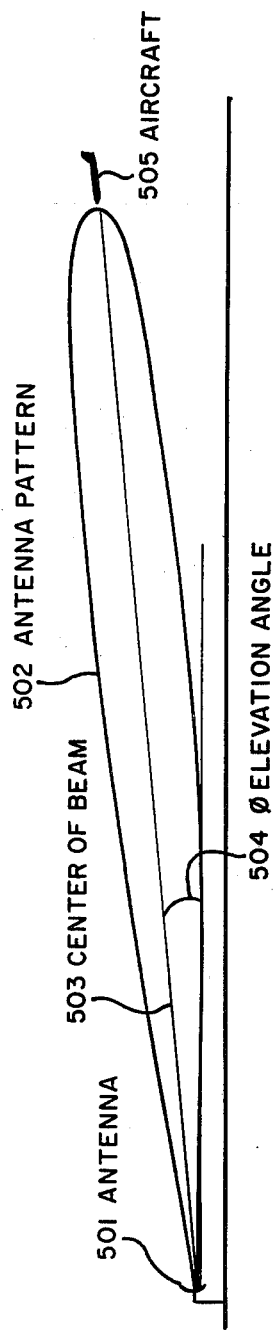
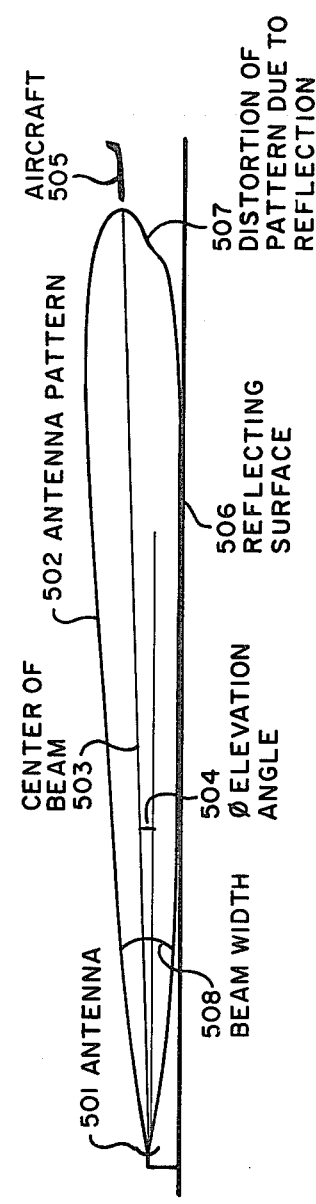

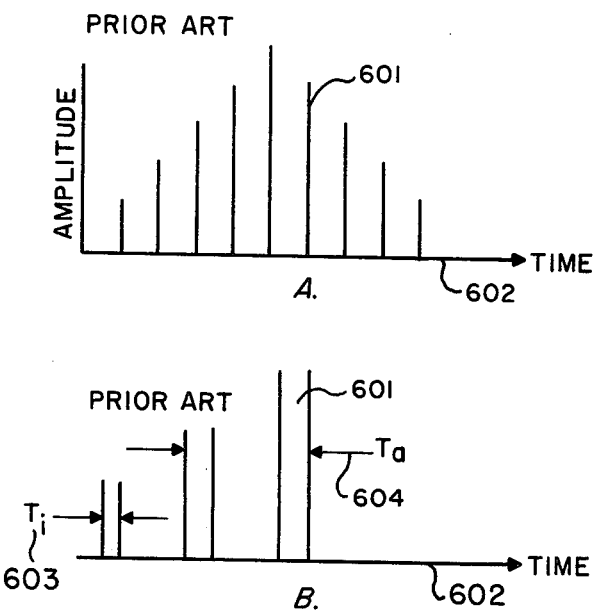
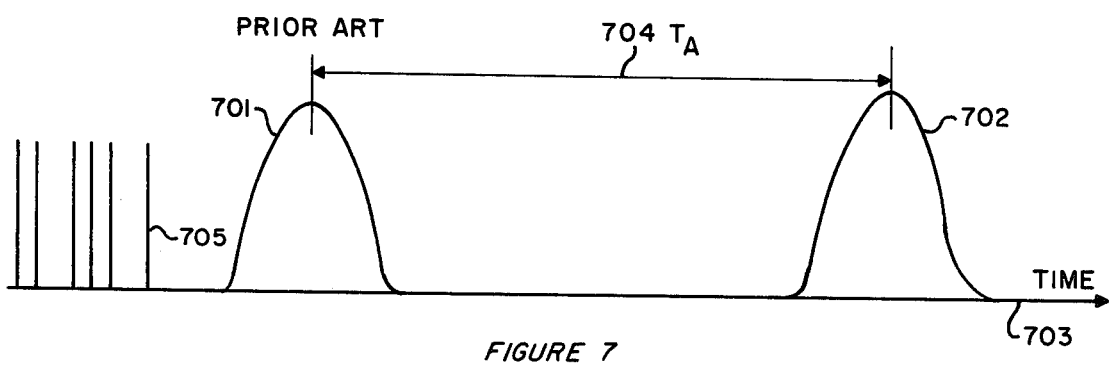

LOW ANGLE ELEVATION GUIDANCE SYSTEM

BACKGROUND 1. Field

This invention relates to aircraft landing systems and particularly to improvements in the low elevation angle accuracy of such systems. 2. Prior Art Aircraft elevation guidance systems generally comprise a ground based transmitting system and an airborne receiving system. The ground base transmitting system includes a vertically scanning antenna which produces a narrow beam pattern of only a few degrees in elevation. This beam is swept in the vertical direction to illuminate an aircraft for only a brief interval during the sweep period. The elevation angle of the transmitting antenna is continuously measured and this information is transmitted with the beam to the aircraft. In one of the most commonly employed systems, the beam signal comprises a series of pulse pairs. The antenna elevation angle information is encoded in the beam signal by adjusting the time between the pulse pairs.

FIG. 6A illustrates the beam signal as received by the aircraft. The amplitude rises and then falls as the beam passes the aircraft producing an overall envelope which is the pattern of the transmitting antenna. The beam signal comprises a number of pulse pairs, illustrated in FIG. 6A as single lines such as the line 601. The individual pulses in each pair are shown in detail in FIG. 6B.

The time interval between the pulses in a pair, designated as $T_i$ and indicated by drawing numeral 603, is typically 12 microseconds. This time interval identifies the signal as the elevation guidance signal. The time between the pairs, designated $T_a$ and indicated by drawing numeral 604, provides angular information. Typically $T_a$ is 60 microseconds plus a number of microseconds equal to twice the elevation angle of the transmitting antenna expressed in degrees.

The transmitted pattern and method of transmitting elevation angle information in the newly proposed time reference scanning beam microwave landing system or MLS is shown in FIG. 7. The MLS system is a CW system in which a digital word 705 is transmitted first to identify the beam as an elevation beam. As the beam sweeps past the aircraft in one direction it produces a first beam pattern indicated by drawing numeral 701. In passing the aircraft the second time in the reverse direction, the beam produces another beam pattern 702. The time between the peaks of the two beams, $T_a$, indicated by drawing numeral 704 represents the elevation angle of the transmitting antenna, and consequently, the elevation angle of the aircraft with respect to the landing surface.

In both the pulsed and the MLS systems, the aircraft receiving system calculates the elevation angle of the aircraft with respect to the surface as viewed from the transmitting antenna by determining when the center of the beam passed the aircraft and the value of the encoded elevation angle at that time. In both systems, the time of occurrance of the center of the pattern may be measured by halving the time that the beam signal exceeds a threshold.

FIG. 5A illustrates the transmitting antenna beam pattern and elevation angle at the center of the pattern. In this Figure, the antenna 501, transmits a beam with a pattern 502 at an aircraft 505. The center of the beam is represented by a line designated by drawing numeral 503 while the elevation angle $\phi$ is designated by drawing numeral 504.

Although there are differences between the pulsed and MLS systems in encoding angular information, both systems use a vertically swept beam which is subject to distortion caused by surface reflections at low elevation angles. This difficulty arises as the antenna is swept downward, bringing the edge of the beam to the earths surface. As the antenna continues to sweep downward, a portion of the transmitted signal is directed at the ground, producing a reflection which is received by the aircraft. This is shown in FIG. 5B where the beam pattern distortion 507, due to the reflections from surface 506, is evident. The distorted pattern causes an error to be produced in the aircraft receiving systems determination of the center of the beam. The result is inaccurate data at a critical point in the landing approach.

Prior art attempts to correct this have usually centered on installing large, costly antennas to narrow the beamwidth, an economically unsatisfactory solution where many existing installation would have to be retrofitted with large antennas.

SUMMARY

In a preferred embodiment of the present invention, the distortion produced by the reflection of the beam from the surface is eliminated by modification of both the transmitting and receiving systems.

To eliminate the reflections, transmission is terminated by the transmitting system when an elevation angle is reached which would result in appreciable ground reflections. The termination of transmission produces a truncated pattern which is received by aircraft at low elevation angles.

For the receiving system to continue functioning in a useful manner under these conditions, it must accept the truncated pattern and accurately determine from this information the center of a corresponding, perfectly completed pattern, as well as the elevation angle at the center of this completed pattern. This is accomplished by incorporating in the receiving system a means for generating an ideal beam pattern which is adjusted in amplitude and phase to provide the best fit to the received truncated beam pattern. The truncated pattern is then replaced by the ideal pattern in the normal processing in the system to determine the pattern center and the correct elevation angle.

BRIEF DESCRIPTION OF THE DRAWINGS

FIGS. 5A and 5B illustrate a distorted pattern produced by surface reflections.

FIG. 6 illustrates the signal format employed by pulsed elevation guidance systems.

FIG. 7 illustrates the signal format employed by CW elevation guidance systems.

DETAILED DESCRIPTION

In a preferred embodiment of the present invention, the distortion in the received beam pattern is eliminated by terminating transmission at the ground station before the transmitting antenna is depressed to an elevation angle which would result in appreciable surface reflections. The termination of transmission at the ground station reduces the complication of the airborne receiving equipment which would be required to accomplish the same results. The termination produces a truncated beam pattern, such as pattern 402 in FIG. 4A. Contrasted with the truncated pattern in the same Figure is an ideal pattern 401.

In the usual processing within the receiving system, the time of occurrance of the center of the beam is determined by well known techniques such as halving the time between the pattern 3dB points. If this technique were applied to the truncated pattern 402, an erroneous pattern center would result. The error in the time of occurrance of the pattern center can be described with the aid of the nomenclature shown in FIG. 4. In this Figure, the time of occurrance of the center of the ideal beam 401 with respect to an arbitrary reference time $T_0$ is designated $T_1$. The time of occurrance of the center of the received truncated beam with respect to $T_0$ is designated as time $T_2$ and the difference between the times $T_1$ and $T_2$ is designated as $T_3$ or the correction time. The elevation angles at times $T_1$ and $T_2$ are $\phi_1$ and $\phi_2$ respectively. The subscript "A", "B" and "C" refer to the corresponding drawing in FIG. 4 and the relative position of the received and ideal patterns shown in the particular drawing. The basic definition of the times $T_1$, $T_2$ and $T_3$ remain the same throughout FIG. 4, but their values are different for each of the relative position of the patterns.

Figure 4A:
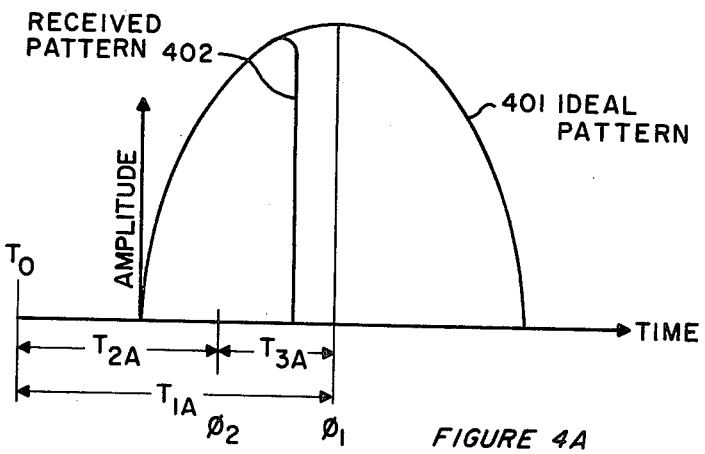
FIGS. 4A, 4B and 4C illustrate the method of fitting an ideal pattern to a truncated received pattern.

FIG. 4A shows the ideal pattern "perfectly" fitted in amplitude and phase to the truncated beam. That is, when the antenna is sweeping downward, the leading edge of the ideal pattern is aligned with the leading edge of the truncated pattern. If the antenna were sweeping upward, the truncation would occur first and the trailing edges would be matched. However, by appropriate matching, the ideal pattern supplies the pattern information which would have been supplied if the received pattern had not been truncated. In order to approach a perfect fit, a number of trials normally must be made in both amplitude and time. That is, the ideal beam and received beams must be shifted with respect to one another in phase and amplitude to achieve the best possible fit. For illustrative purposes herein, the received beam will be considered as constant in phase and amplitude while the ideal beam will be considered as adjustable and only downward sweeping beams will be discussed.

Figure 4B:
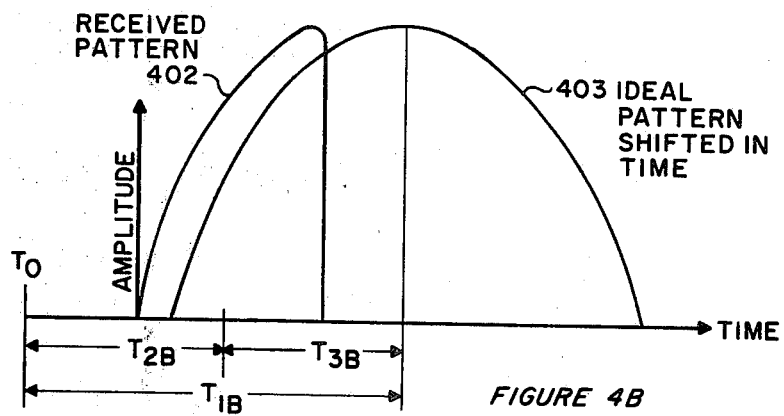
Figure 4C:
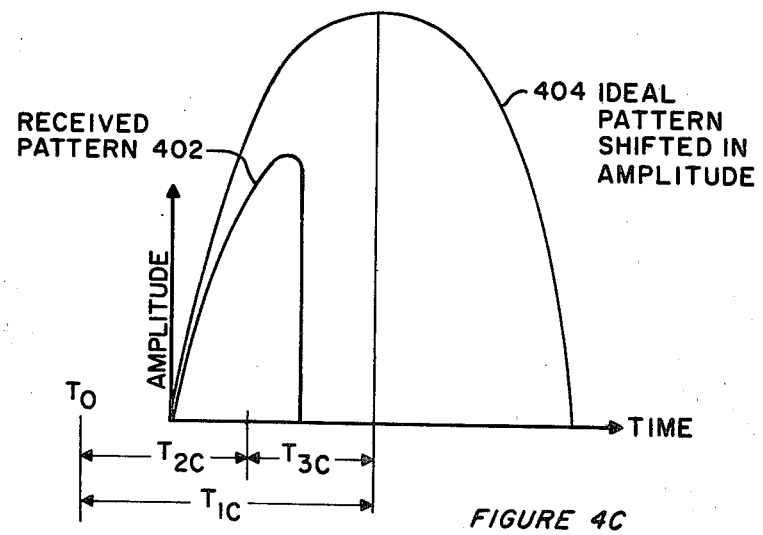

FIG. 4B illustrates the case where the received and ideal patterns are matched in amplitude, but not in phase. FIG. 4C illustrates the case where the two are matched in phase, but not in amplitude.

Figure 1:
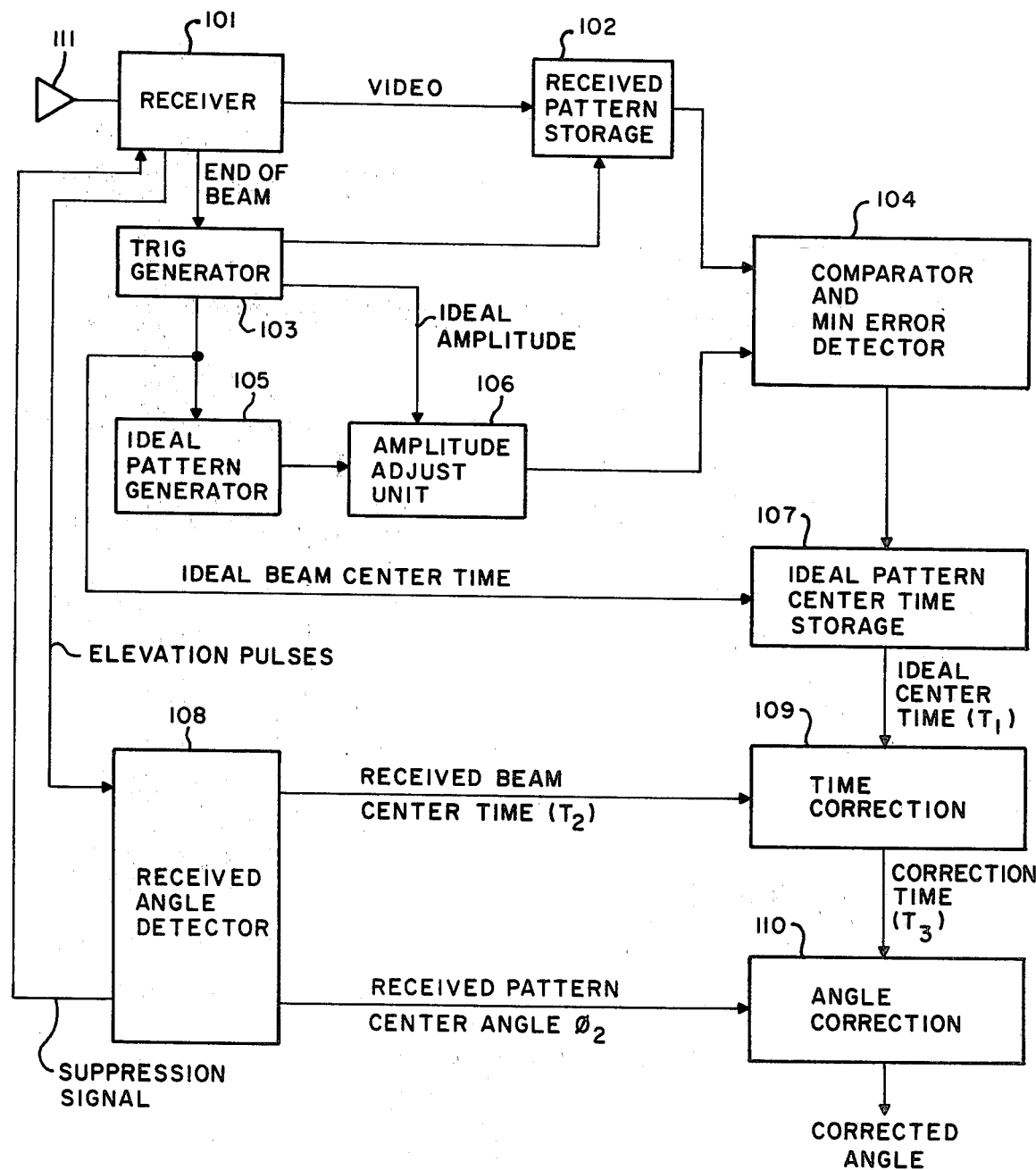
FIG. 1 is a block diagram of a basic receiving system incorporating the present invention.

To accomplish the adjustment of the ideal pattern in phase and amplitude necessary to match it to the received pattern, the receiving system of FIG. 1 has been developed. This system comprises an antenna 111, a receiver 101, a received pattern storage 102, a trigger generator 103, an ideal pattern generator 105, an amplitude adjustment unit 106, a comparator-minimum error detector 104, an ideal pattern center time storage unit 107, a time correction unit 109, an angle correction unit 110, and a received angle detection unit 108.

In the operation of the system shown in FIG. 1, a received beam signal is fed from the antenna 111 to the RF receiver 101 where it is detected. The detected pattern of the received beam signal is supplied to unit 102 where it is stored for use in a series of trial comparisons with an ideal beam pattern.

After the beam has swept past the aircraft and its strength has fallen below a predetermined threshold level, the receiver sends an end-of-beam signal to the trigger generator 103. The primary function of the trigger generator is to supply a series of pulse pairs. One pulse of the pair is directed to the ideal pattern generator 105, while the other is directed to the received pattern storage unit 102 to cause these devices to supply an ideal pattern and a received pattern to the comparator 104. The time between the pulses in the pair is varied in successive pairs to change the relative phase of the patterns.

The ideal pattern is adjusted in amplitude by passing the ideal pattern signal through the amplitude adjustment unit 106 prior to supplying it to the comparator 104. For each phase relationship between the two patterns, the trigger generator send a series of triggers to the amplitude adjustment unit 106, each trigger causing the unit 106 to change its attenuation, until unit 106 has been stepped through its entire attenuation range. The phase relationship between the received and ideal patterns is not changed until unit 106 has completed stepping through its range.

The comparator measures the error between the ideal pattern and the received pattern. Whenever a trial comparison produces a measured error that is the least obtained up to the trial at hand, the center time of the ideal pattern $T_1$ for that trial, supplied by the trigger generator, is stored in storage unit 107. The previously stored time is removed upon entry of the new time.

The operation of the portion of the system described above has accomplished the adjustment of the ideal pattern to match the received pattern in phase and amplitude and the time of the center of the matched ideal pattern $T_1$ has been stored.

The purpose of the remainder of the system is to determine the correct elevation angle $\phi_1$ from the time $T_1$ now stored in unit 107. As can be seen in FIG. 4, subtracting the center time of the truncated pattern $T_2$ from $T_1$ will produce the correction time $T_3$. This time in conjunction with the elevation angle $\phi_2$ may be used to determine the angle $\phi_1$.

The initial step in determining $\phi_1$ is to supply the raw received elevation angle information, such as the spacing between pulses, to the angle detector 108, where the elevation angle at the center of the received truncated beam $\phi_2$ is detected. The angle $\phi_2$ is then fed to the angle correction unit 110.

The angle detector also determines the time of occurrance of the center of the received beam $T_2$ which is supplied to the time correction unit 109, where it is subtracted from the time $T_1$ to produce the time $T_3$. The time $T_3$ is then supplied to the angle correction unit 110 where it is applied to correct the angle $\phi_2$ and produce the correct elevation angle $\phi_1$.

Many of the functions shown in FIG. 1 may be performed by well known circuitry. The trigger generator 103 produces a series of pulses with fixed timing relationships. This function is easily carried out with the aid of standard analog timing circuits or digital components, such as a clock, a counter, a memory and appropriate control circuitry.

The ideal pattern generator 105 produces an envelope which approximates the pattern of the transmitting antenna. This may be carried out conveniently in most instances by means of a sin X over X generator. The amplitude adjustment unit may be a stepped attenuator which steps throughout its range on commands produced by the trigger generator.

The received angle detection function merely requires the measurement of the time between pulse pairs or between the peaks of two successive patterns depending on whether a pulsed or CW system is employed. This timing function may be carried out with analog or digital circuits as described in connection with the trigger generator.

The time correction circuit is simply a subtraction operation which may be carried out with either a comparator or a digital subtractor. The angle correction unit adds the angle corresponding to the time $T_3$ to the angle $\phi_2$. The time $T_3$ may be converted to an angle by multiplying it by a scale factor. The addition of the resulting angle to $\phi_2$ may be conveniently carried out with a summer or digital adder.

Figure 2:
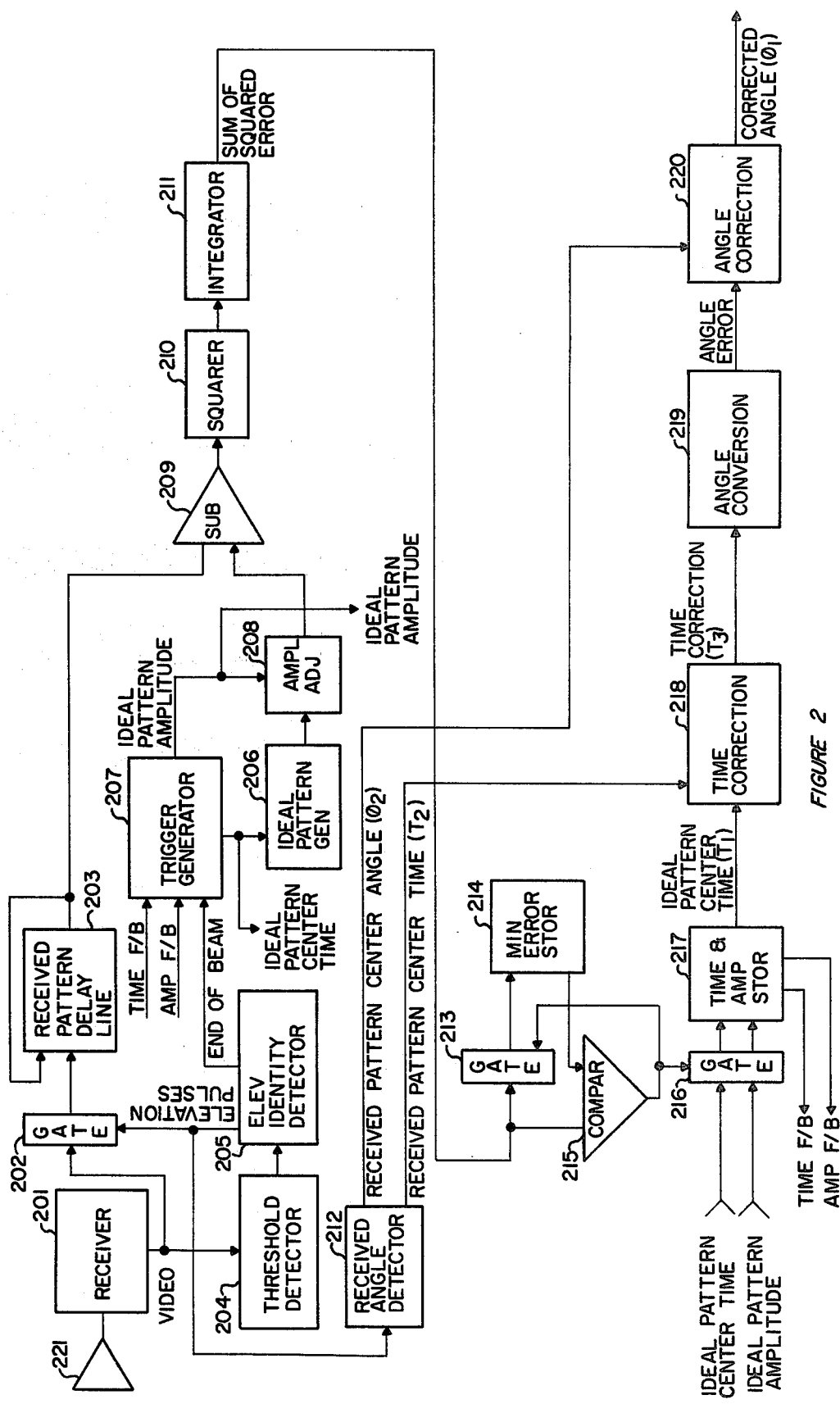
FIG. 2 is a detailed block diagram of a more detailed receiving system incorporating the present invention.

Additional circuit details are shown in FIG. 2. This Figure illustrates a more detailed diagram of a system similar to that shown in FIG. 1. The system of FIG. 2 comprises an antenna 221, a receiver 201, a gate 202, a received pattern recirculating delay line 203, a threshold detector 204, an elevation identity detector 205, an ideal pattern generator 206, a trigger generator 207, an amplitude adjustment unit 208, a subtractor 209, a squarer 210, an integrator 211, a received angle detector 212, a gate 213, a minimum error storage unit 214, a comparator 215, a gate 216, a time and amplitude storage unit 217, a time correction unit 218, an angle conversion unit 219, and an angle correction unit 220.

In the operation of the system shown in FIG. 2, the detected video signal from receiver 201 is fed through the threshold detector 204, the elevation identity detector 205, to the trigger generator 207. The signal arriving at the trigger generator is the end-of-beam signal corresponding to that received by the trigger generator in FIG. 1. The threshold detector 204 merely sets a level below which signals are not processed. The elevation identity detector 205 only passes signals from the elevation beam as opposed to other signals, such as those from an azimuth beam. The elevation identity is determined by the pulse spacing in pulse systems or by the coding 705 shown in FIG. 7 for the MLS systems.

A second output from the elevation identity detector controls gate 202, permitting the received beam pattern from the receiver 201 to pass by way of the threshold and elevation identity units through the gate to the received pattern delay line 203. The received pattern is continually recirculated through the delay line to repetitively produce the pattern at its output. Although the delay line does not require a trigger to produce the received pattern, it produces the pattern at a constant rate which is entirely equivalent to the function of the received pattern storage unit 102 in FIG. 1. This repetitive pattern is supplied to the subtractor 209 for comparison with the ideal pattern.

The trigger generator 207 performs the same function as the trigger generator 103 in FIG. 1. Output signals from this generator actuate the ideal pattern generator 206 and the amplitude adjustment unit 208 to supply the subtractor 209 a pattern in varying phase and amplitude relationship with the received pattern from the recirculating delay line. The output of the subtraction unit is the comparison error signal which is squared and integrated in squarer 210 and integrator 211. The error signal in the integrator is then supplied to the gate 213 and the comparator 215.

The comparator 215 compares the error from the trial at hand with the minimum error from previous trials, which is stored in unit 214. If the error signal from the trial at hand is less than the minimum error signal in storage unit 214, the comparator output actuates gate 213 and permits the new minimum error signal to pass into the minimum error storage unit 214, where it is recorded while the previous minimum error is erased.

Each time a new minimum error signal is stored, the comparator 215 also actuates gate 216 which passes the ideal pattern center time and ideal pattern amplitude from the trigger generator 207 into the time and amplitude storage unit 217.

The received angle detector unit 212 produces the receive pattern center angle and the received pattern center time $T_2$. The time $T_2$ from unit 212 and the ideal pattern center time $T_1$ from unit 217 are fed to the time correction unit 218 to produce the correction time $T_3$. The time and amplitude storage unit 217, which is used to hold the value of $T_1$, corresponds to the ideal pattern center time storage unit 107 in FIG. 1, while the time correction unit 218, which subtracts $T_2$ from $T_1$, corresponds to the time correction unit 109 in FIG. 1.

The time $T_3$ is fed to the angle conversion unit 219 which applies the scale factor necessary to convert the time $T_3$ into a correction angle. This correction angle is supplied to the angle correction unit 220 in conjunction with the received pattern center angle $\phi_2$ from the received angle detection unit 212, to produce the correct angle $\phi_1$.

The time and amplitude storage unit 217 also feeds back to the trigger generator 207, the time and amplitude of the ideal beam which up to the trial at hand has provided the closest match, in order to better direct the range of search controlled by the trigger generator 207.

Figure 3A:
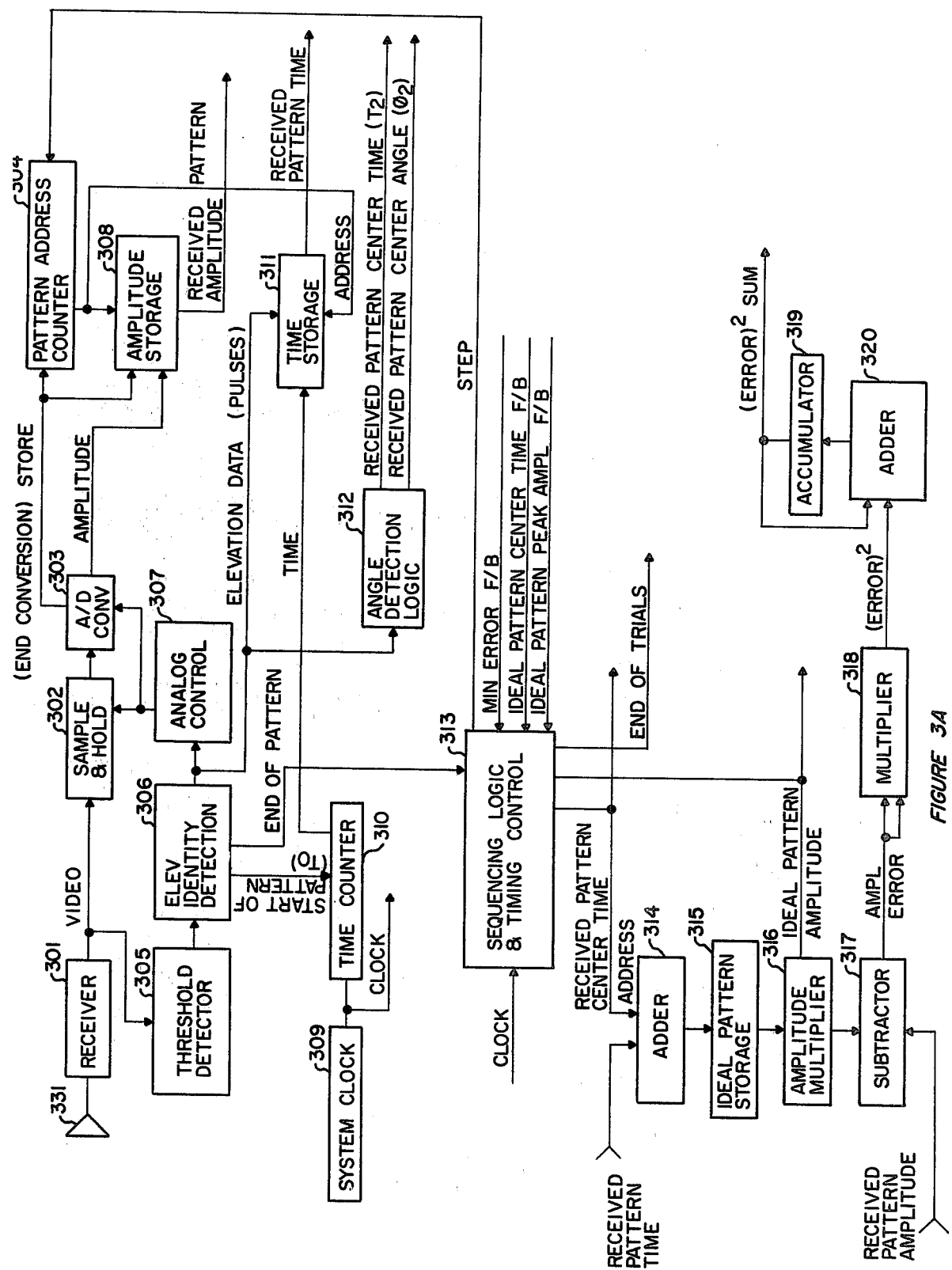
FIGS. 3A and 3B is a detailed block diagram of a digital receiving system incorporating the present invention.
Figure 3B:
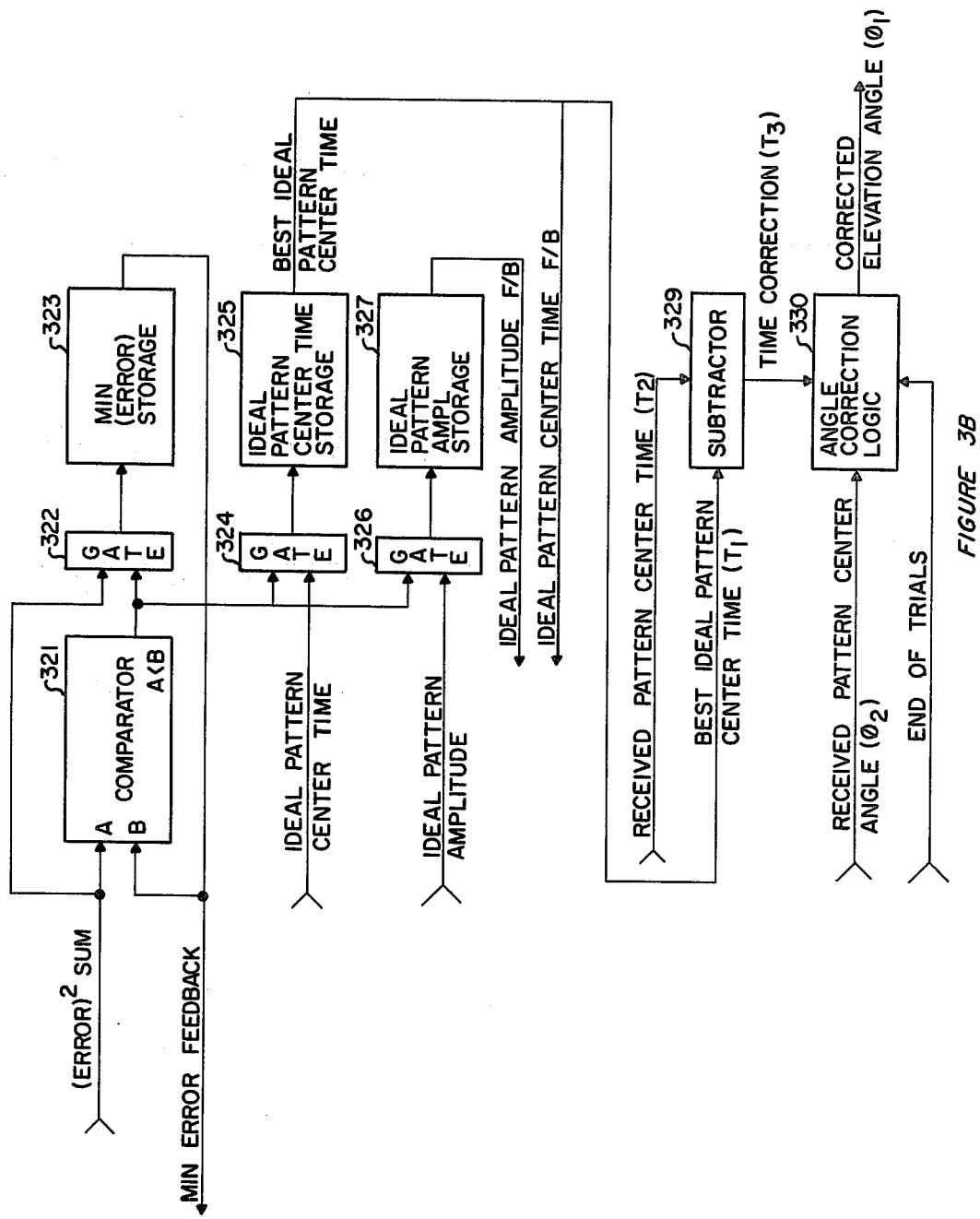

A digital system for accomplishing the same functions as were accomplished in the system shown in FIG. 2 is shown in FIG. 3. The system of FIG. 3 comprises an antenna 331, a receiver 301, a sample and hold unit 302, an analog to digital converter unit 303, a pattern address counter 304, a threshold detector 305, an elevation identity detection unit 306, an analog control unit 307, an amplitude storage unit 308, a system clock 309, a counter 310, an angle detection logic unit 312, a time storage unit 311, sequencing logic and timing control unit 313, an adder 314, an ideal pattern storage unit 315, an amplitude multiplier 316, a subtractor 317, a multiplier 318, an adder 320, an accumulator 319, a comparator 321, a gate 322, a minimum error storage unit 323, a gate 324, an ideal pattern center time storage 325, a gate 326, an ideal pattern amplitude storage 327, a subtractor 329, and an angle correction logic unit 330.

The receiving system of FIG. 3 may be adapted to operate with either a pulsed or a CW transmitting system, however, to illustrate its operation, only a pulse guidance system will be considered herein. In the operation of the receiving system of FIG. 3, a signal received at the antenna 331 is passed through the receiver 301 to produce a video output comprised of video pulse pairs. The pulses are passed through the threshold detector and elevation identity detection unit to the analog control unit 307. The analog control unit passes the pulse signal to the sample and hold circuit 302 for storage. The analog control unit also transmits a signal to the analog to digital converter 303 directing it to start converting the amplitude of the pulse held in the sample and hold unit 303 to digital form. The analog to digital converter first transmits an end of conversion signal to the amplitude storage unit 308, and then transmits the amplitude of the pulse in digital form. The end of conversion signal is also transmitted to the pattern address counter 304 which indexes this unit to produce a new digital address. The address is transmitted to the amplitude storage unit to identify the location of the pulse amplitude.

The time used as a reference in this system is the time $T_0$, described in FIG. 4. Timing is measured with the aid of the system clock 309 and the counter 310. The counter is initialized, or set to $T_0$, by a start of beam signal received from the elevation identity detection unit 306.

The elevation identity detection unit also transmits the second pulse of the received pair to the time storage unit 311. This unit records the time of receipt of the second pulse at an address supplied by the pattern address counter which corresponds to the address in unit 308 used for the amplitude of the same pulse.

The process described above for the digital storage of the amplitude and time of receipt of the second pulse in each pair is repeated until the beam has passed. At that time, the elevation identity detector 306 in combination with the threshold detector 305 produce an end-of-beam signal which is transmitted to the sequencing logic and timing control circuit 313.

Upon the receipt of the end of the beam signal, the sequencing and timing control unit produces a stepping signal which is fed to the pattern address counter 304. The pattern address counter then transmits a signal to the amplitude storage unit and the time storage unit causing these units to supply the stored time and amplitude of the pulses making up the received pattern to the adder 314 and the subtractor 317, respectively, in the sequence that these pulses were received.

The received pattern pulse time signal is added to the ideal beam center time in the adder 314 and is then fed to the ideal beam storage unit 315 which produces a series of digital words corresponding to the amplitude of the series of pulses in the ideal beam. These words are then fed in sequence to the amplitude multiplier 316 which digitally adjusts the amplitude of each pulse. The output of the amplitude multiplier is fed to the subtractor 317 where it is compared with the received pattern amplitude from the amplitude storage unit 308. The output of the subtractor is fed to the amplitude error multiplier 318 to square the value of the difference between these two signals. The output of the multiplier 318, which is a digital word representing the error squared for each pulse trial is fed to the adder 320. The adder 320 adds the error for a particular pulse trial to what has already been accumulated from previous pulse trials in the accumulator 319 in order to sum the error of all the pulses making up one sweep of the beam.

In a manner similar to that applied in the systems of FIGS. 1 and 2, the best fit between the ideal beam pattern and the received beam pattern is obtained by adjusting the phase and amplitude of the ideal beam pattern. The phase adjustment is accomplished by transmitting a digital word from the sequencing and timing and logic control unit 313 to the adder 314. This word, referred to as the ideal pattern center time, shifts the relative time of the center of the ideal pattern with respect to the received pattern, thus varying the phase and the time $T_1$. The amplitude is adjusted by a digital word, referred to as the ideal pattern amplitude, which is transmitted from the sequencing logic and timing control unit 313 to the amplitude multiplier unit 316.

After the completion of the trials, the trial producing the minimum error is determined. This is accomplished by transmitting the error squared signal for each trial from the accumulator 319 to the comparator 321. In the comparator, the minimum error from previous trials stored in the minimum error storage unit 323 is compared with the error from the immediately prior comparison stored in the accumulator 319. If the error received from the accumulator is less than the error stored in unit 323, the previous error is removed and the error from the accumulated 319 is stored in its place. Whenever a new minimum error is entered into storage, the comparator 321 also transmits signals to open gates 324 and 326, and pass the ideal pattern center time for the trial at hand to the ideal pattern center time storage unit 325, and also pass the corresponding ideal pattern amplitude information to the ideal pattern amplitude storage unit 327.

The outputs of the ideal pattern center storage unit 325 and the ideal pattern amplitude storage unit 327 represent the best results of the trials, and therefore indicate at any time during the trials, the amplitude and center time corresponding to minimum error obtained up to the moment. This information is fed back to the sequencing logic and timing control unit 313 to determine the direction in which the signals to the ideal pattern center time and amplitude control unit must progress in order to produce the minimum error in the least number of trials. These feedback signals also enable unit 313 to determine when the minimum error for all trials has been obtained. Unit 313 then transmits an end of trials signal to the angle correction logic unit 330. This processing has provided the best ideal pattern center time $T_1$, which is stored in unit 325.

The angle $\phi_2$ and the time $T_2$ must be determined next in order to calculate $\phi_1$. For a pulse system, the angle $\phi_2$ is referred to as an average elevation angle, as the elevation angle of the transmitting antenna continually changes. Consequently, the time between the pulse pairs, $T_a$ changes across the beam. The angle $\phi_2$ is determined by measuring the time between each pair in the received beam pattern, averaging it, and then multiplying the resulting average by a scale factor to convert the average time to an angle. These operations are accomplished in the angle detection logic unit 312.

The angle detection logic unit transmits the received beam center time $T_2$ to the subtractor 329, and the received beam center angle $\phi_2$ to the angle correction logic unit 330. The received beam center time $T_2$ is subtracted from the ideal beam center time $T_1$ in subtractor 329 to produce the correction time $T_3$. The time $T_3$ is fed to the angle correction logic unit 330 which converts this time into a correction angle and adds it to $\phi_2$ to produce the corrected elevation angle $\phi_1$.

The digital components which may be applied to perform the functions in the system of FIG. 3 are well known and require no further elaboration here. However, various modification and different applications of this system are worthy of note.

A slightly different comparison technique which is entirely equivalent and which achieves the same end may also be utilized. For a particular trial, for each received pulse amplitude, an ideal pattern time is determined which is subtracted from the received pattern time to get a time error. Squaring and summing this error across the pattern yields a sum of time error squared instead of the sum of amplitude error squared.

With this technique, it is only necessary to go through the amplitude adjustment trials of the ideal pattern for minimum time error only once even though a considerable phase error may exist. The phase error trials are also done only once after the amplitude has been adjusted.

The number of phase trials required to converge to the minimum error point can be minimized by keeping track of not only the sum of the time error squares, but also of the sum of the time error during the amplitude adjustment process. After the amplitude of the ideal beam has been adjusted to obtain a minimum sum of time error squares, the sum of time error corresponding to the minimum error trial provides a direct measure of the phase adjustment necessary to minimize the sum of time error squared between the input and ideal beam.

The received signal may be suppressed aboard the aircraft rather than at the ground station. This may be accomplished by feeding a signal from the received angle detection unit 108 to the receiver 101 as shown in FIG. 1. This signal is produced in the angle detection unit 108 when the detected elevation angle indicates appreciable reflections will occur, which is typically an elevation angle equal to one-half beamwidth.

The system may be further modified to obtain usable data at an elevation angle equal to one-fourth beamwidth. This may be accomplished in two ways. In the first, a series of additional trials are carried out to match the ideal pattern to the received pattern, taking into account the reflected component from the surface which produces distortion in the received pattern. In the second, a priori data as to the expected pattern distortion may be applied to reduce the range over which these trials must be carried out.

Although elevation guidance has been referred to throughout, it is within the comprehension of this invention to apply the same techniques to beams sweeping in other directions such as azimuthal guidance beams.

The order of trials suggested herein for illustrative purposes is first, a single variation in phase, followed by the complete range of variation in amplitude. The reverse may be applied or entirely different sequences may be carried out to rapidly converge on the best fit, such as by employing feedback of the minimum error data to reduce the number of trials.

The present invention may be applied to advantage when the received pattern is not truncated. A thresholding circuit is usually employed in the receiver to eliminate weaker signals which may be affected by noise or other factors. The threshold level may be lowered with the present system to accept a greater number of pulses because of the use of the ideal pattern to provide a form of averaging in the determination of the center of the beam. The use of a greater number of pulses also improves the determination of the elevation angle as well as the determination of the center of the beam.

The matching of an ideal beam pattern to a perturbed beam and the substitution of the matched ideal beam pattern to improve accuracy or other performance features is not restricted to guidance systems. This invention may be applied to improve such systems as air traffic control radar beacons and search radars where perturbed patterns may be received.

Wherever data is quantized and the data most generally follow a known function such as a transmitting antenna pattern, the received data may be improved by adjusting it in accordance with the known function in the manner shown herein. The improvement thus obtained may be applied to savings in other areas of a system. For example, the scanning rate of a guidance system antenna may be increased without increasing the prf rate and without any loss in accuracy.

Similarly, application of the present invention in a system employing scanning phased array antennas permits the use of lower cost antennas with courser scanning steps while maintaining the same accuracy as would have been provided by much more expensive antennas.

Having described the invention, we claim:

1. An aircraft guidance system of the type wherein a ground station transmitting system transmits a sweeping beam pattern and beam angle information to an airborne receiving system which determines the angle of the aircraft from the received beam pattern and the angle information, characterized in that said receiving system includes:
    (a) means for storing and retrieving the received beam pattern,
    (b) means for producing an ideal beam pattern,
    (c) means for comparing the ideal pattern with the received pattern to determine the error between the two,
    (d) means for shifting the received and ideal patterns in relative amplitude and phase to produce minimum error between the two, and
    (e) means for substituting the ideal pattern, at the relative amplitude and phase which produced the minimum error, for the received pattern to determine the aircraft angle.

2. A guidance system as claimed in claim 1, further characterized in that:
    (a) said transmitting system includes means for terminating transmission at a transmitted beam angle during the sweep before appreciable pattern distortion is produced by surface reflection, and
    (b) said means for comparing, compares the corresponding portion of the ideal pattern with the remaining received pattern when the received pattern is truncated by the termination of transmission.

3. Apparatus as claimed in claim 1, wherein said receiving system includes:
    (a) means for suppressing reception of incoming signals from the ground station at an angle of the transmitted beam before appreciable pattern distortion is produced by surface reflection, said angle before appreciable distortion is produced being detected by the receiving system during the beam sweep, and
    (b) said means for comparing, compares the corresponding portion of the ideal pattern with the remaining received pattern, when the received pattern is truncated by the suppression of reception.

4. An aircraft guidance system of the type wherein a ground station transmitting system transmits a sweeping beam and the beam elevation angle information to an airborne receiving system which determines the elevation angle of the aircraft from the transmitted beam pattern and the transmitted beam elevation angle information, characterized in that said receiving system comprises:
(a) receiving means for detecting the sweeping beam signals above a threshold and for producing an end of beam signal when the beam signal falls below said threshold,
(b) means for generating a number of sets of trigger signals in a predetermined time relationship, said triggers being initiated by said end of beam signal,
(c) a first storage means for accepting the detected sweeping beam pattern from said receiver, storing said pattern and retrieving it on command in accordance with a first set of trigger signals from said means for generating sets of trigger signals,
(d) means for producing an ideal beam pattern signal on command in accordance with a second set of trigger signals from said means for producing sets of trigger signals, the time relationship between corresponding triggers in said first and second set of trigger signals being varied to vary the phase between the ideal and received patterns,
(e) means for adjusting the amplitude of the ideal pattern produced in said means for generating an ideal pattern on command in accordance with a third set of signals from said means for generating trigger signals, said third set of signals being some multiple of the number of trigger signals in the second set to vary the amplitude of each ideal pattern through a range of steps determined by said multiple,
(f) means for comparing the received pattern from said first storage means with the adjusted ideal pattern from said means for adjusting amplitude to determine and store the minimum error of all comparisons,
(g) a second storage means storing a fourth set of signals from said trigger generator which indicate the center time of the ideal pattern adjusted in phase to produce the minimum error,
(h) means for determining the transmitted elevation angle at the center of the received pattern and the center time of the received pattern from the detected received signals supplied by said receiving means,
(i) subtraction means for accepting the received pattern center time and the ideal pattern center time that produced the minimum error and subtracting the two to produce a correction time signal, and
(j) angle correction means for accepting the correction time signal and the transmitted elevation angle at the center of the received pattern, said angle correction means converting said correction time to a correction angle signal by multiplying it by a scale factor, and then adding said correction angle to the transmitted elevation angle at the center of the received pattern to produce the corrected elevation angle.

5. Apparatus as claimed in claim 4, wherein said receiver includes means for converting all output signals from said receiver to digital form, all other signals after passing through the receiver are in digital form and all means for operating on these signals are digital means.

6. A method for improving the accuracy of aircraft guidance systems in which a ground station transmitting system transmits a sweeping beam and beam angle information to an airborne receiving system which determines the angle of the aircraft from the received beam pattern and the beam angle information, comprising the steps of:
(a) producing an ideal pattern within the receiving system,
(b) comparing said ideal pattern with the received pattern to determine the error between the two,
(c) shifting the received and ideal patterns in relative amplitude and phase to produce minimum error between the two, and
(d) substituting for the received pattern, in the portion of the receiver processing used to determine the correct angle information, the idealized pattern at the relative amplitude and phase which produced the minimum error in step (c).

7. A method as claimed in claim 6, further comprising the steps of:
(a) terminating the transmission of the beam at an angle during the sweep before appreciable pattern distortion is produced by surface reflections, and
(b) comparing the corresponding portions of the ideal pattern with the remaining received pattern truncated by the termination of transmission to determine the minimum error as claimed in step (b) of claim 6.

* * * * *